(12) United States Patent
Mattioli Della Rocca et al.

(10) Patent No.: US 10,598,787 B2
(45) Date of Patent: Mar. 24, 2020

(54) METHOD AND APPARATUS FOR MEASURING TIME OF FLIGHT

(71) Applicant: STMicroelectronics (Research & Development) Limited, Marlow, Buckinghamshire (GB)

(72) Inventors: Francescopaolo Mattioli Della Rocca, Edinburgh (GB); Neale Dutton, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 670 days.

(21) Appl. No.: 15/343,427

(22) Filed: Nov. 4, 2016

(65) Prior Publication Data

US 2018/0128921 A1    May 10, 2018

(51) Int. Cl.
| | |
|---|---|
| *G01C 3/08* | (2006.01) |
| *G01S 17/89* | (2020.01) |
| *G01S 17/32* | (2020.01) |
| *G01S 7/4914* | (2020.01) |
| *G01S 7/481* | (2006.01) |

(52) U.S. Cl.
CPC ............ *G01S 17/89* (2013.01); *G01S 7/4816* (2013.01); *G01S 7/4914* (2013.01); *G01S 17/32* (2013.01)

(58) Field of Classification Search
CPC ...... G01S 17/89; G01S 7/4816; G01S 7/4914; G01S 17/32
See application file for complete search history.

(56) References Cited

U.S. PATENT DOCUMENTS

| | | | | |
|---|---|---|---|---|
| 5,365,184 A | * | 11/1994 | Callender | ................. G01P 3/36 324/118 |
| 2013/0077082 A1 | | 3/2013 | Mellot | |
| 2015/0285625 A1 | * | 10/2015 | Deane | ..................... G01S 17/10 348/140 |
| 2016/0047904 A1 | | 2/2016 | Mellot | |
| 2017/0052065 A1 | * | 2/2017 | Sharma | ................. G01S 7/4863 |
| 2017/0139041 A1 | * | 5/2017 | Drader | .................. G01S 7/4863 |
| 2018/0123611 A1 | * | 5/2018 | Dutton | ...................... G01J 1/44 |

* cited by examiner

*Primary Examiner* — Samantha K Abraham
(74) *Attorney, Agent, or Firm* — Crowe & Dunlevy

(57) ABSTRACT

SPADs detect photons of a return light pulse and output corresponding pulse signals. First and second counters, when enabled in response to phase measurement value, are configured to count the pulse signals. The phase measurement value is set for a subsequent iteration of the return light pulse in response to processing of first and second count values of the first and second counters, respectively, for a current iteration. If the first count value exceeds the second count value by more than a difference threshold limit, the phase measurement value is decremented for the subsequent iteration. Otherwise, the phase measurement value is incremented for the subsequent iteration. If the difference threshold limit is not satisfied, the phase measurement value may be maintained for the subsequent iteration, but one of the counters is preloaded for the subsequent iteration with a value equal to a magnitude of the difference between the count values.

20 Claims, 7 Drawing Sheets

METHOD AND APPARATUS FOR MEASURING TIME OF FLIGHT

TECHNICAL FIELD

The present invention relates to the measurement of time of flight by detecting a difference in phase between a periodic excitation signal and a corresponding response signal and, in particular, to an improved time of flight measurement circuit.

BACKGROUND

The time of flight (TOF) technique for determining a distance to an object is well known in the art. This TOF technique comprises sending a light signal towards an object and measuring the time taken by the light signal to travel to the object and return back. Generally, the measurement of the time is accomplished by measuring a time shift between the emitted light signal and the detection by a light sensor of a return signal reflected from the object. With knowledge of this time shift t, in consideration of the fixed speed of light c, one can easily calculate the distance d to the object (d=c*t/2).

TOF detectors, and in particular TOF image sensors, are used in a wide range of applications spanning from gaming to imaging to security and to safety. In many of these TOF imaging applications, high frame rate and high spatial resolution are system design requirements. Conventional TOF detectors, however, are unable to satisfy these system design requirements.

FIG. 1 shows a block diagram of a conventional TOF detector. A light emitter 10, typically in the form of an infrared laser emitter (such as a vertical-cavity surface-emitting laser (VCSEL) diode), periodically emits a light signal 12 toward an object 14. The photons reflected from the object 14 produce a reflected (return) light signal 16 directed back toward a photosensor 18. The photosensor 18 is typically a single photon avalanche diode (SPAD). In a preferred implementation, multiple SPADs are provided in a detector array 20. The SPAD photosensors 18 of the SPAD array 20 are configured in avalanche mode and in response to receiving a photon of the reflected light signal 16, the SPAD photosensor 18 produces a detection (avalanche) pulse 22. Because the SPAD array 20 includes many SPAD photosensors 18, a plurality of detection pulses 24 are generated for each light signal 12 emission. These pulses, collectively referred to as a return pulse 25 (see, FIG. 2), will occur over a range of time due to a number of well-known factors. A measurement circuit 26 is provided to determine a midpoint 28' of the return pulse 25 (i.e., where one-half of the detection pulses 22 of the return pulse 25 occur before the midpoint and one-half of the detection pulses occur after the midpoint). The time difference between a reference signal 28 indicating the timing of the emitted light signal 12 and the detected midpoint 28' represents the time of flight and is then used to calculate the distance to the object.

It is known in the art to implement the measurement circuit 26 as an analog circuit (see, United States Patent Application Publication No. 2013/0077082, incorporated herein by reference) and as a digital circuit (see, United States Patent Application Publication No. 2016/0047904, incorporated herein by reference). Improvements in the design and operation of the measurement circuit 26 are, however, needed in order to support a desired increase in frame rate and spatial resolution.

SUMMARY OF THE INVENTION

It is to be understood that both the foregoing general description and the following detailed description are exemplary and explanatory and are intended to provide further explanation of the invention as claimed.

In an embodiment, an imaging system comprises: an array of pixels arranged in rows and columns, wherein each pixel comprises: a plurality of single photon avalanche diodes (SPADs); a first counter having a clock input coupled to outputs of the plurality of SPADs in said pixel and configured to count during a first temporal window; a second counter having a clock input coupled to outputs of the plurality of SPADs in said pixel and configured to count during a second temporal window; and a phase selector circuit configured to select a transition time between the first and second temporal windows in response to a phase measurement value; and a phase processor circuit for each column of said array, wherein the phase processor circuit is configured to process a first count value from the first counter and a second count value from the second counter to determine said phase measurement value.

The imaging system further comprising a clock generator circuit for each row of said array, wherein each clock generator circuit outputs a plurality of clock signals applied to the pixels of the corresponding row, said phase selector circuit receiving said plurality of clock signals as inputs, processing the plurality of clock signals and selecting certain clock signals in response to the phase measurement value to control opening of said first and second temporal windows.

In an embodiment, an imaging system comprises: an array of pixels arranged in rows and columns, wherein each pixel comprises: a plurality of single photon avalanche diodes (SPADs); a first counter having a clock input coupled to outputs of the plurality of SPADs in said pixel and configured to count in response to assertion of a first enable signal; a second counter having a clock input coupled to outputs of the plurality of SPADs in said pixel and configured to count in response to assertion of a second enable signal; and a phase selector circuit configured to select a phase of the first and second enable signals in response to a phase measurement value. The imaging system further comprises a phase processor circuit for each column of said array, wherein the phase processor circuit is configured to process a first count value from the first counter and a second count value from the second counter to determine said phase measurement value.

The imaging system further comprises a clock generator circuit for each row of said array, wherein each clock generator circuit outputs a plurality of clock signals applied to the pixels of the corresponding row, said phase selector circuit receiving said plurality of clock signals as inputs, processing the plurality of clock signals and generating the first and second enable signals having phases selected by the phase measurement value.

In an embodiment, an imaging system comprises: a plurality of single photon avalanche diodes (SPADs); a first counter having a clock input coupled to outputs of the plurality of SPADs and configured to count in response to assertion of a first enable signal; a second counter having a clock input coupled to outputs of the plurality of SPADs and configured to count in response to assertion of a second enable signal; a phase selector circuit configured to select a phase of the first and second enable signals in response to a phase measurement value; and a phase processor circuit configured to process a first count value from the first counter and a second count value from the second counter to determine said phase measurement value.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
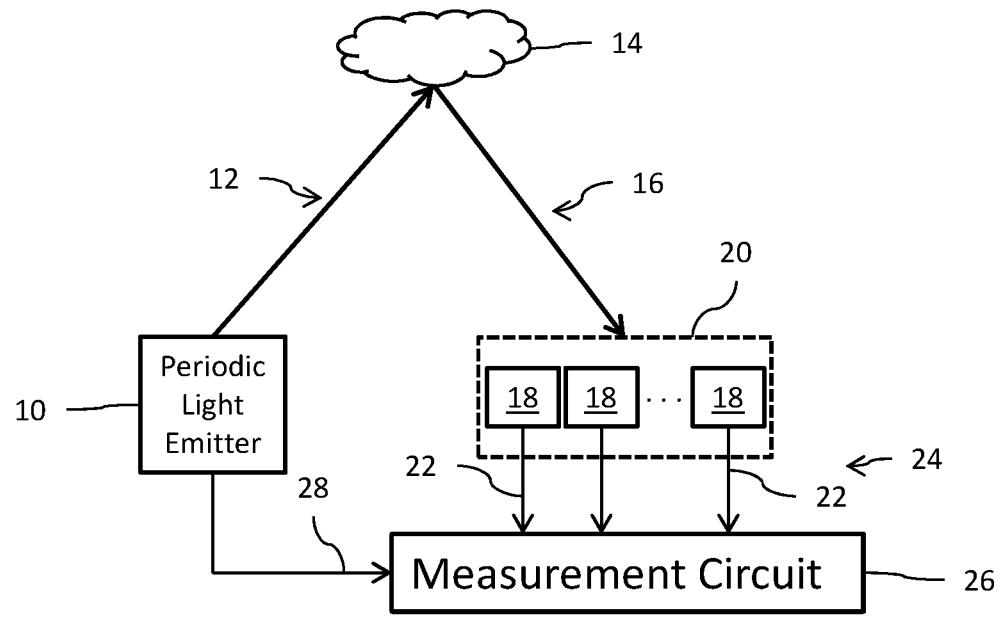
FIG. 1 is a block diagram of a conventional time of flight (TOF) detector.
Figure 2:
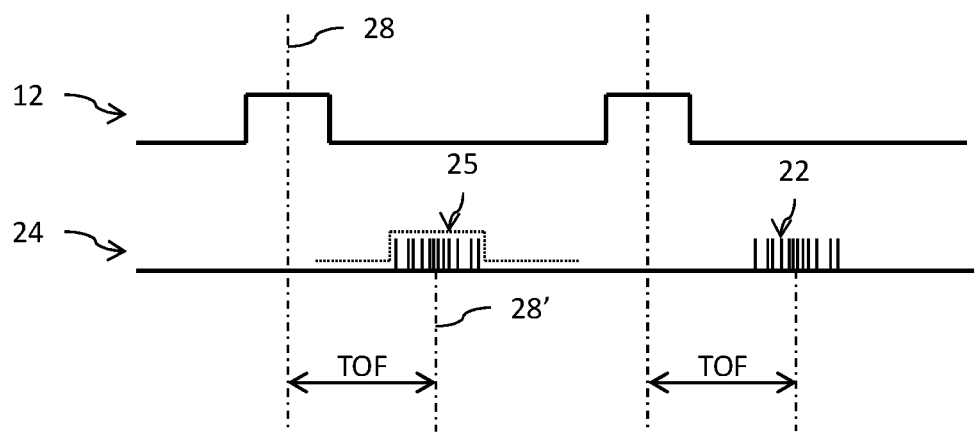
FIG. 2 is a timing diagram for TOF measurement.
Figure 3:
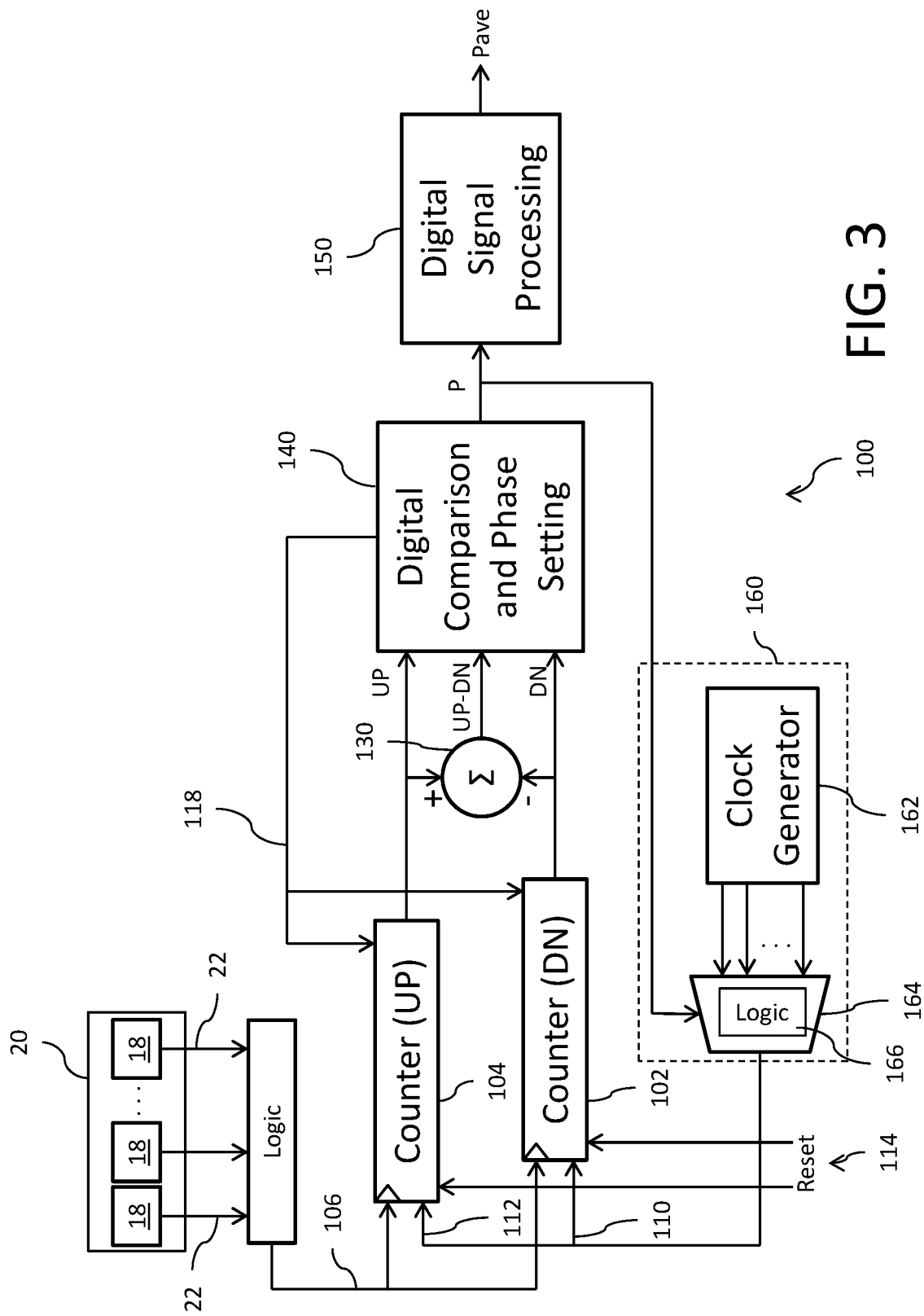
FIG. 3 is block diagram of a time of flight (TOF) measurement circuit.

Reference is now made to FIG. 3 showing a block diagram of a time of flight (TOF) measurement circuit 100. The measurement circuit 100 includes a first digital counter circuit 102 and a second digital counter circuit 104. Each digital counter circuit includes a clock input, an enable input, a reset input and a load input. The digital counter circuits may, for example, be implemented as ripple counters.

The clock inputs of the first and second counters 102 and 104 receive a SPAD signal 106 that comprises the logically combined detection pulses 22 generated from the SPAD photosensors 18 within the SPAD array 20 in response to receipt of the photons of the reflected (return) light signal 16. As an example, the logical combination may be implemented using a logical OR-tree circuit. Thus, the clock inputs of the first and second counters 102 and 104 receive the SPAD signal 106 which comprises a return pulse 25 including the detection pulses 22.

The enable inputs of the first and second counter circuits 102 and 104 receive a first window signal 110 and second window signal 112, respectively. The first counter circuit 102 is enabled for a first temporal window in response to assertion of the first window signal 110. The second counter circuit 104 is enabled for a second temporal window in response to assertion of the second window signal 112. Only one counter circuit will be enabled at a time to count the pulses 22 of the SPAD signal 106. So, when the first window signal 110 is asserted, the first counter circuit 102 is enabled for the duration of the first temporal window to count the number of pulses 22 within the SPAD signal 106 that occur during the first temporal window time period and store a first count value which is referred to herein as a DN count value. Conversely, when the second window signal 112 is asserted, the second counter circuit 102 is enabled for the duration of the second temporal window to count the number of pulses 22 within the SPAD signal 106 that occur during the second temporal window time period and store a second count value which is referred to herein as an UP count value. The timing of the transition between the first temporal window (responsive to the first window signal 110) and the second temporal window (responsive to the second window signal 112) is set in accordance with a selected one of a plurality of possible measurement phase values as will be described in more detail below. The goal of the operation of the circuit 100 is to control the timing of the transition between the first and second temporal windows so that the transition occurs at or about the midpoint of the return pulse 25. As noted above, if the timing of the midpoint and the timing and light signal are known, the time of flight measurement can be made to determine the distance to the object.

The reset inputs of the first and second counter circuits 102 and 104 receive a reset signal 114. In response to assertion of the reset signal, the DN and UP count values are reset to zero.

The load input of the first and second counter circuits 102 and 104 receives a load signal 118. Through the load input, as specified by the load signal 118, a desired count value may be selectively loaded into one or the other of the first and second counter circuits.

The measurement circuit 100 further includes a digital summation circuit 130 having a first input configured to receive the DN count value stored in the first counter circuit 102 and a second input configured to receive the UP count value stored in the second counter circuit 104. The digital summation circuit 130 operates to calculate a difference between the DN and UP count values and outputs that calculated difference as a difference value UP-DN.

The measurement circuit 100 still further includes a digital comparison and phase setting circuit 140 having a first input configured to receive the DN count value stored in the first counter circuit 102, a second input configured to receive the difference value UP-DN output from the summation circuit 130 and a third input configured to receive the UP count value stored in the second counter circuit 104. The digital comparison circuit 140 processes the DN count value, the difference value UP-DN and the UP count value in order to determine whether the current value of the measurement phase P (which sets the timing of the transition between the first and second temporal windows) should be incremented, decremented or remain the same. The digital comparison circuit 140 outputs the determined measurement phase P value to control the generation of the first and second window signals 110 and 112 to produce the desired timing of the transition between the first and second temporal windows.

Figure 4:
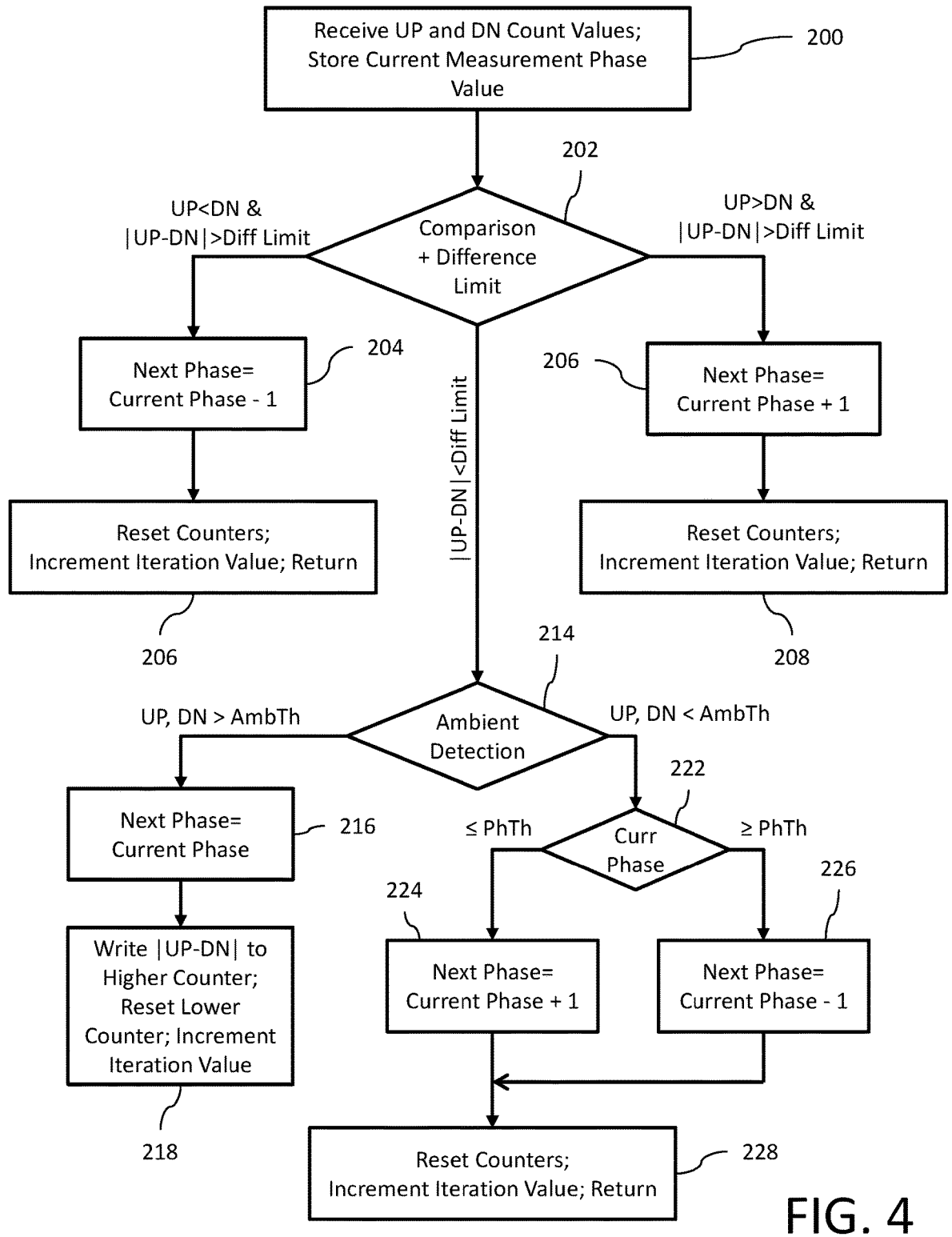
FIG. 4 is a flow diagram for operation of the TOF measurement circuit.

Reference is now made to FIG. 4 showing a flow diagram for the operation of the digital comparison and phase setting circuit 140. The process of FIG. 4 is performed in an iterative manner with respect to each cycle of the periodically emitted light signal. In step 200, the DN count value, difference value UP-DN and UP count value are received and a certain phase measurement value P has been set. In a first time through the process of FIG. 4, an initial phase measurement value is used and the iteration value is initialized to one. In subsequent iterations of the FIG. 4 process, the phase measurement value P is set as a result of processing by the previous iteration which also increments the iteration value. In step 202, a comparison and difference limit test is applied to the DN count value, the difference value UP-DN and the UP count value.

If the UP count value is less than the DN count value, and if the magnitude (absolute value) of the difference value UP-DN is greater than a difference limit threshold (Diff Limit), then a significantly higher number of pulses 22 of the SPAD signal 106 were counted by the first counter circuit 102 (during the first temporal window) than by the second counter circuit 104 (during the second temporal window). This indicates that the measurement phase value setting the timing of the transition between the first and second temporal windows is too high (in other words, the timing of the transition is too late to be at or about the midpoint of the return pulse 25). The process then proceeds to step 206 where the measurement phase value is decremented (for example, by one) so as to shift the timing of the transition between the first and second temporal windows closer in time (i.e., earlier) to the pulse of periodically emitted light signal. Then, in step 208, the reset signal 114 is asserted to reset the DN and UP count values to zero and the iteration value is incremented. The process then returns back to step 200 for a next iteration corresponding to a next cycle of the periodically emitted light signal.

Referring again to step 202, if the DN count value is less than the UP count value, and if the magnitude (absolute value) of the difference value UP-DN is greater than the difference limit threshold (Diff Limit), then a significantly higher number of pulses 22 of the SPAD signal 106 were counted by the second counter circuit 104 than by the first counter circuit 102. This indicates that the measurement phase value setting the timing of the transition of between the first and second temporal windows is too low (in other words, the timing of the transition is too early to be at or about the midpoint). The process then proceeds to step 210 where the measurement phase value is incremented (for example, by one) so as to shift the timing of the transition between the first and second temporal windows further away in time (i.e., later) from the pulse of the periodically emitted light signal. Then, in step 212, the reset signal 114 is asserted to reset the DN and UP count values to zero and the iteration value is incremented. The process then returns back to step 200 for a next iteration corresponding to a next cycle of the periodically emitted light signal.

With reference once again to step 202, if the magnitude (absolute value) of the difference value UP-DN is less than (or equal to) the difference limit threshold (Diff Limit), then there is an insignificant difference between the DN count value and the UP count value. This could indicate that the measurement phase value setting the timing of the transition between the first and second temporal windows is close to the midpoint 26 where one-half of the detection pulses occur within the first temporal window and one-half of the detection pulses occur within the second temporal window. Alternatively, this could indicate that only ambient light is being detected and that neither of the first and second temporal windows correspond to pulses 22 within the return pulse 25. Accordingly, an ambient light detection test is performed in step 214 by comparing each of the DN and UP count values to an ambient threshold value (AmbTh).

If either of the DN and UP count values exceed the ambient threshold value, this indicates that the SPADs are detecting more than just ambient light (i.e., they are detecting the reflected light signal). The process then proceeds to step 216 where the new value of the measurement phase is maintained at its previous value. Then, in step 218, the magnitude of the difference value UP-DN is loaded into the one of the first and second counter circuits having the higher count value and the other counter circuit is reset. This is accomplished using the load signal 118 to load the difference value UP-DN into one counter circuit and using the reset signal 114 reset the value in the other counter circuit to zero. The iteration value is incremented and the process then returns back to step 200 for a next iteration corresponding to a next cycle of the periodically emitted light signal.

With reference once again to step 214, if both of the DN and UP count values are less than (or equal) to the ambient threshold value, this indicates that the SPADs are detecting only ambient light. The value of the measurement phase may be positioned at a dead zone where neither of the first and second temporal windows are active while pulses 22 of the return pulse 25 are generated. The current value of the measurement phase is compared in step 222 to a phase threshold value (PhTh). If the current measurement phase value is less than the phase threshold value, the process then proceeds to step 224 where the measurement phase value is incremented (for example, by one) so as to shift the timing of the transition between first and second temporal windows further away in time from the pulse of the periodically emitted light signal. Conversely, if the current measurement phase value is greater than the phase threshold value, the process then proceeds to step 226 where the measurement phase value is decremented (for example, by one) so as to shift the timing of the transition between the first and second temporal windows closer in time to the pulse of the periodically emitted light signal. In either case, the process proceeds to step 228 where the reset signal 114 is asserted to reset the DN and UP count values to zero and the iteration value is incremented. The process then returns back to step 200 for a next iteration corresponding to a next cycle of the periodically emitted light signal.

Reference is once again made to FIG. 3. The stored values of measurement phases P over time are processed by a digital signal processing circuit 150 that functions to accumulate the measurement phase values over time and calculate an average of those values. That average phase value (Pave) of the measurement phase values is indicative of the time of flight and can be used to calculate the distance to the object.

The measurement circuit 100 still further includes a signal generator circuit 160 configured to generate the first and second window signals 110 and 112 so as to control the transition between the first and second temporal windows at time set by the measurement phase P value selected by the digital comparison and phase setting circuit 140. In an embodiment, the signal generator circuit 160 may include a clock circuit 162 generating multiple clock signals with different phases corresponding to the plurality of possible temporal windows and measurement phases and a selection circuit (such as a multiplexer) 164 that selects from the generated clock signals in response to the measurement phase selected by the digital comparison and phase setting circuit 140 for output as the first and second window signals 110 and 112. The selection circuit 164 may include a logic circuit 166 that logically combines the two or more of the clock signals from the signal generator circuit 160 to generate the various phases of the first and second window signals 110 and 112 for selection so as to control timing of the first and second temporal windows.

Figure 5A:
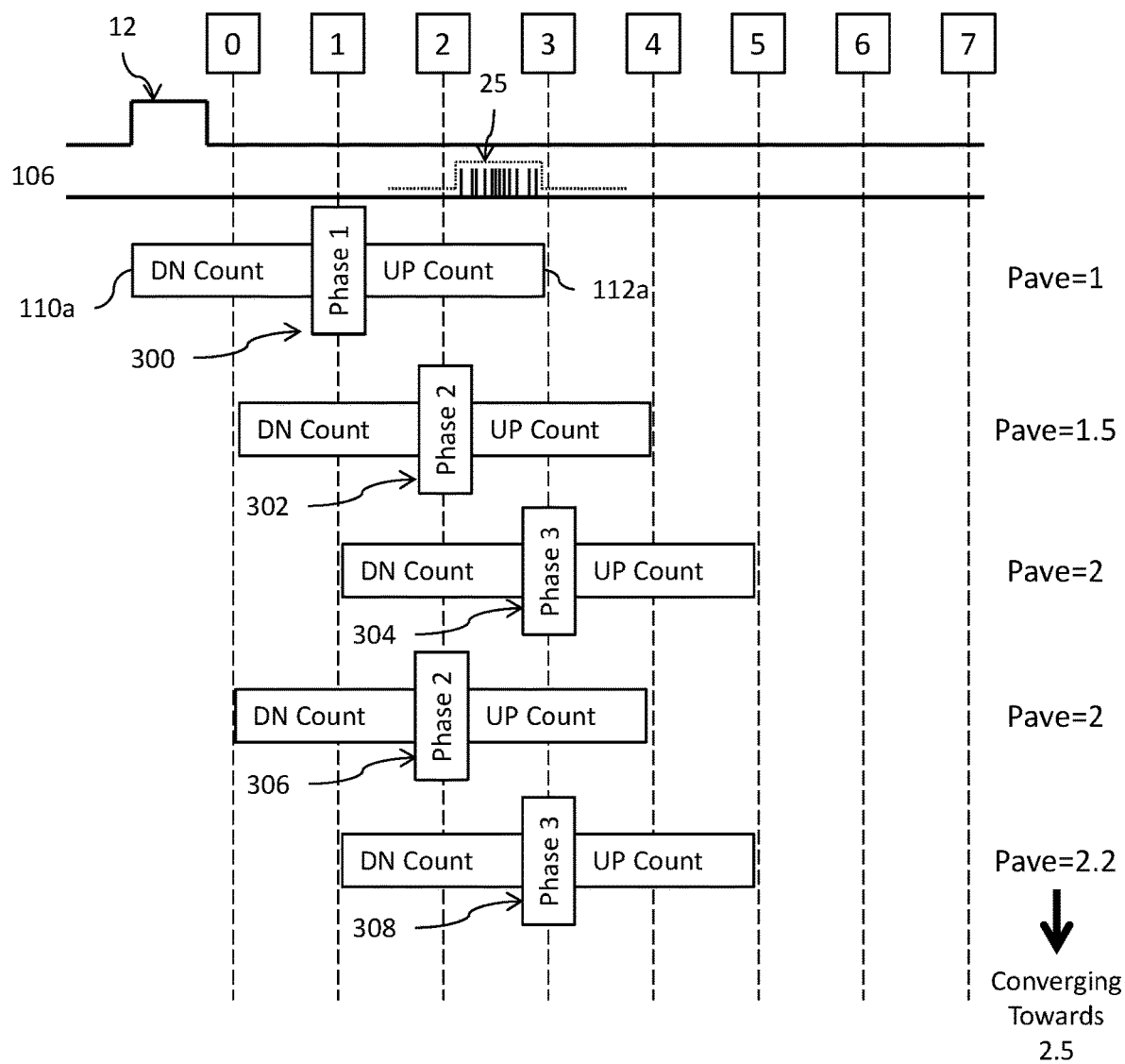
FIGS. 5A-5C show examples of operation of the TOF measurement circuit.
Figure 5B:
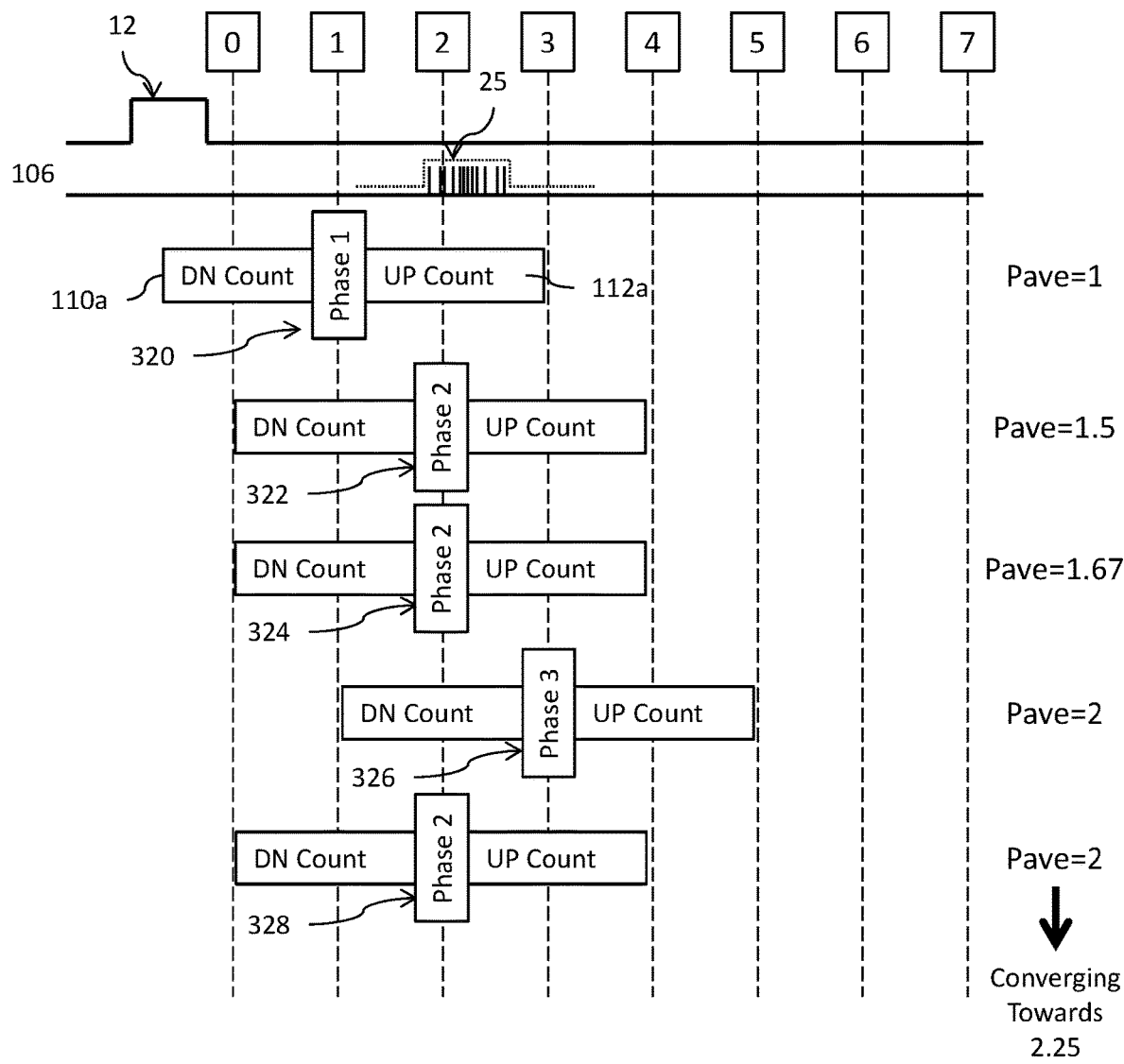
Figure 5C:
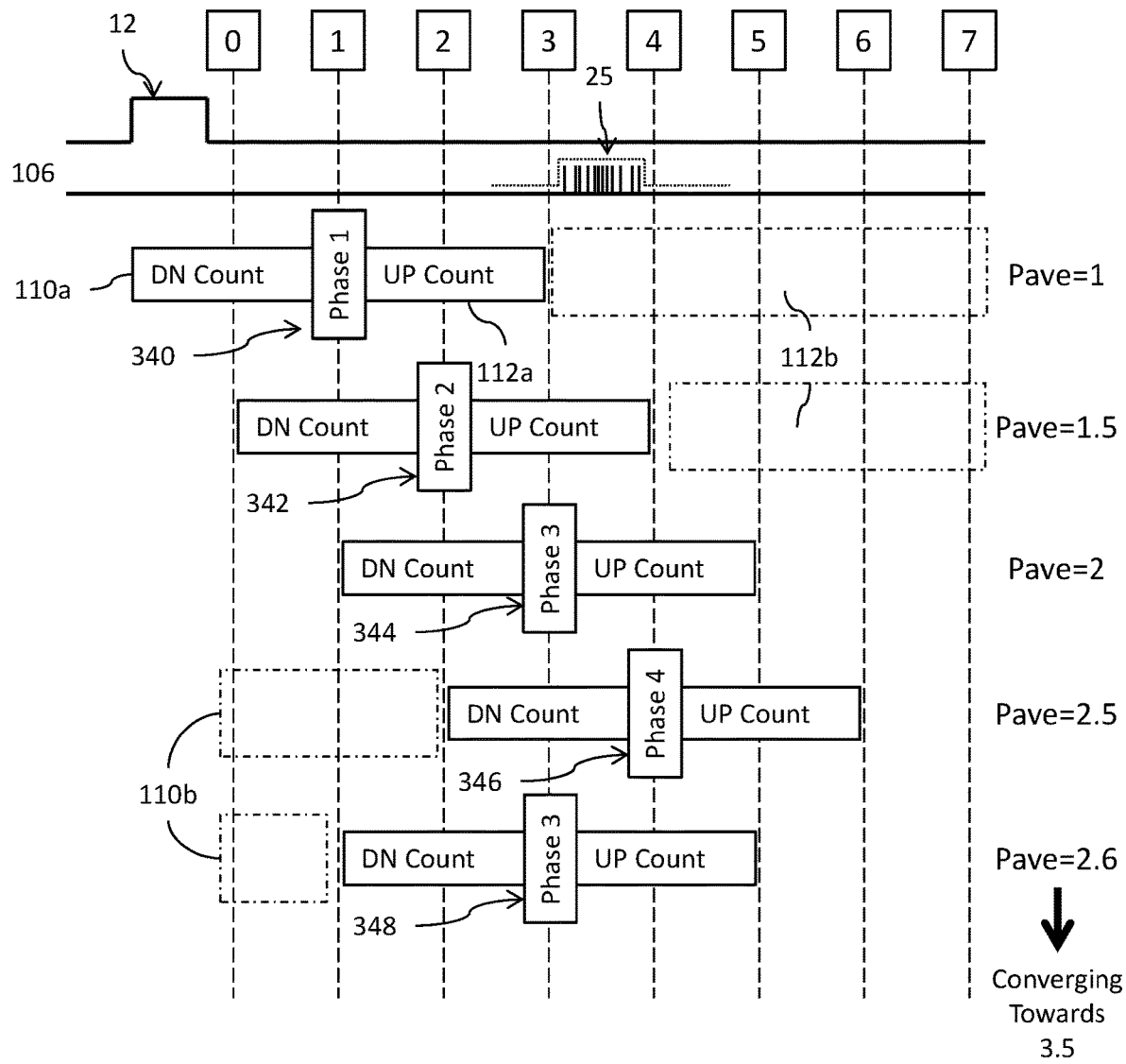

Operation of the TOF measurement circuit 100 may be better understood by reference to a few processing examples as shown in FIGS. 5A-5C. In FIGS. 5A-5C, the vertical direction corresponds to iterations of the overall process shown in FIG. 4. In the horizontal direction, time flows relative to the performance of the process of FIG. 4 for each iteration. With the horizontal flow of time for each iteration, FIGS. 5A-5C show eight different locations for the timing of the transition between the first temporal window 110a (associated with assertion of the first window signal 110) and the second temporal window 112a (associated with assertion of the second window signal 112), these locations corresponding to eight different phase measurement values (0-7). The pulse of periodically emitted light signal 12 starts prior to the time of the first (P=0) phase measurement value. The SPAD signal 106 is generated in response thereto, with that SPAD signal including a plurality of pulses 22 within each return pulse 25. The timing of the return pulse 25 of the SPAD signal 106 may fall anywhere within the range of the eight different phase measurement values dependent on the distance to the object.

Reference is now made to the example processing operation of FIG. 5A. Assume here that the return pulse 25 within the SPAD signal 106 is centered at a time located between the second and third phase measurement values, and in particular at a time about halfway between the second and third phase measurement values. This would be represented by a phase measurement value of 2.5 and it is this value that the TOF measurement circuit 100 is trying to detect. In a first iteration of the FIG. 4 process, the phase measurement value P is initialized to a designated initial value. In this example, the initial phase measurement value is P=1. The digital signal processing circuit 150 sums the accumulated phase measurement values and calculates an average phase equal to the accumulated phase divided by the iteration value. At this point, accumulated phase is 1 and the iteration value is 1, so the average phase is Pave=1/1=1.

With the phase measurement value at P=1, the first and second window signals 110 and 112 are generated and selected by the signal generator circuit 160 such that the transition between the first and second temporal windows 110a and 110b occurs at a time associated with the first phase measurement value. This window transition is designated at reference 300. Prior to the transition 300, the first window signal 110 is asserted to open the first temporal window 110a and the first counter circuit 102 is enabled to count pulses 22 within the return pulse 25 of the SPAD signal 106. After the transition 300, the second window signal 112 is asserted to open the second temporal window 110b and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the temporal window timing for enabling the first and second counter circuits with P=1, it would be expected that the UP count value exceeds the DN count value. Indeed, that is the case in this example. Furthermore, the difference value UP-DN exceeds Diff Limit. The process of FIG. 4 accordingly moves to step 206 and the value of the phase measurement is incremented by one to a value of P=2. The iteration value is further incremented to two, and the process returns to step 200.

With the phase measurement value now P=2, the digital signal processing circuit 150 sums the accumulated phase measurement values and calculates an average phase equal to the accumulated phase divided by the iteration value. At this point, accumulated phase is 1+2=3 and the iteration value is 2, so the average phase is Pave=3/2=1.5.

For the next pulse of the periodically emitted light signal, the position of the return pulse 25 within the SPAD signal 106 has not substantively changed from the prior iteration. With the phase measurement value at P=2, the first and second window signals 110 and 112 are generated and selected by the signal generator circuit 160 such that the transition between the first and second temporal windows occurs at a time associated with the second phase measurement value. This window transition is designated at reference 302. Prior to the transition 302, the first window signal 110 is asserted to open the first temporal window 110a and the first counter circuit 102 is enabled to count pulses 22 within the return pulse 25 of the SPAD signal 106. After the transition 302, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=2, it would be expected that the UP count value exceeds the DN count value. Indeed, that is the case in this example. Furthermore, the difference value UP-DN exceeds Diff Limit. The process of FIG. 4 accordingly moves to step 206 and the value of the phase measurement is incremented by one to a value of P=3. The iteration value is further incremented to three, and the process returns to step 200.

With the phase measurement value now P=3, the digital signal processing circuit 150 sums the accumulated phase measurement values and calculates an average phase equal to the accumulated phase divided by the iteration value. At this point, accumulated phase is 1+2+3=6 and the iteration value is 3, so the average phase is Pave=6/3=2.

For the next pulse of the periodically emitted light signal, the position of the return pulse 25 within the SPAD signal 106 has not substantively changed from the prior iteration. With the phase measurement value at P=3, the first and second window signals 110 and 112 are generated and selected by the signal generator circuit 160 such that the transition between the first and second temporal windows occurs at a time associated with the third phase measurement value. This window transition is designated at reference 304. Prior to the transition 304, the first window signal 110 is asserted to open the first temporal window 110a and the first counter circuit 102 is enabled to count pulses 22 within the return pulse 25 of the SPAD signal 106. After the transition 304, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=3, it would be expected that the DN count value exceeds the UP count value. Indeed, that is the case in this example. Furthermore, the difference value UP-DN exceeds Diff Limit. The process of FIG. 4 accordingly moves to step 204 and the value of the phase measurement is decremented by one to a value of P=2. The iteration value is further incremented to four, and the process returns to step 200.

With the phase measurement value now P=2, the digital signal processing circuit 150 sums the accumulated phase measurement values and calculates an average phase equal to the accumulated phase divided by the iteration value. At this point, accumulated phase is 1+2+3+2=8 and the iteration value is 4, so the average phase is Pave=8/4=2.

For the next pulse of the periodically emitted light signal, the position of the return pulse 25 within the SPAD signal 106 has not substantively changed from the prior iteration. With the phase measurement value at P=2, the first and second window signals 110 and 112 are generated and selected by the signal generator circuit 160 such that the transition between the first and second temporal windows occurs at a time associated with the second phase measurement value. This window transition is designated at reference 306. Prior to the transition 306, the first window signal 110 is asserted to open the first temporal window 110a and the first counter circuit 102 is enabled to count pulses 22 within the return pulse 25 of the SPAD signal 106. After the transition 306, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=2, it would be expected that the UP count value exceeds the DN count value. Indeed, that is the case in this example. Furthermore, the difference value UP-DN exceeds Diff Limit. The process of FIG. 4 accordingly moves to step 206 and the value of the phase measurement is incremented by one to a value of P=3. The iteration value is further incremented to five, and the process returns to step 200.

With the phase measurement value now P=3, the digital signal processing circuit 150 sums the accumulated phase measurement values and calculates an average phase equal to the accumulated phase divided by the iteration value. At this point, accumulated phase is 1+2+3+2+3=11 and the iteration value is 5, so the average phase is Pave=11/5=2.2.

For the next pulse of the periodically emitted light signal, the position of the return pulse 25 within the SPAD signal 106 has not substantively changed from the prior iteration. With the phase measurement value at P=3, the first and second window signals 110 and 112 are generated and selected by the signal generator circuit 160 such that the transition between the first and second temporal windows occurs at a time associated with the third phase measurement value. This window transition is designated at reference 308. Prior to the transition 308, the first window signal 110 is asserted to open the first temporal window 110a and the first counter circuit 102 is enabled to count pulses 22 within the return pulse 25 of the SPAD signal 106. After the transition 308, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=3, it would be expected that the DN count value exceeds the UP count value. Indeed, that is the case in this example. Furthermore, the difference value UP-DN exceeds Diff Limit. The process of FIG. 4 accordingly moves to step 204 and the value of the phase measurement is decremented by one to a value of P=2. The iteration value is further incremented to six, and the process returns to step 200.

With the phase measurement value now P=2, the digital signal processing circuit 150 sums the accumulated phase measurement values and calculates an average phase equal to the accumulated phase divided by the iteration value. At this point, accumulated phase is 1+2+3+2+3+2=13 and the iteration value is 6, so the average phase is Pave=13/6=2.17.

The process as described above can be repeated relative to many pulses of the periodically emitted light signal and the value of Pave will eventually converge towards a value of 2.5 which corresponds to the location of the midpoint of the return pulse 25. From this Pave value, the TOF may be easily calculated since the time delay between the pulse of light and a phase measurement value of 2.5 is a known quantity.

Reference is now made to the example processing operation of FIG. 5B. Assume here that the return pulse 25 within the SPAD signal 106 is centered at a time located between the second and third phase measurement values, and in particular at a time about one quarter between the second and third phase measurement values. This would be represented by a phase measurement value of 2.25 and it is this value that the TOF measurement circuit 100 is trying to detect. In a first iteration of the FIG. 4 process, the phase measurement value P is initialized to a designated initial value. In this example, the initial phase measurement value is P=1. The digital signal processing circuit 150 sums the accumulated phase measurement values and calculates an average phase equal to the accumulated phase divided by the iteration value. At this point, accumulated phase is 1 and the iteration value is 1, so the average phase is Pave=1/1=1.

With the phase measurement value at P=1, the first and second window signals 110 and 112 are generated and selected by the signal generator circuit 160 such that the transition between the first and second temporal windows occurs at a time associated with the first phase measurement value. This window transition is designated at reference 320. Prior to the transition 320, the first window signal 110 is asserted to open the first temporal window 110a and the first counter circuit 102 is enabled to count pulses 22 within the return pulse 25 of the SPAD signal 106. After the transition 320, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=1, it would be expected that the UP count value exceeds the DN count value. Indeed, that is the case in this example. Furthermore, the difference value UP-DN exceeds Diff Limit. The process of FIG. 4 accordingly moves to step 206 and the value of the phase measurement is incremented by one to a value of P=2. The iteration value is further incremented to two, and the process returns to step 200.

With the phase measurement value now P=2, the digital signal processing circuit 150 sums the accumulated phase measurement values and calculates an average phase equal to the accumulated phase divided by the iteration value. At this point, accumulated phase is 1+2=3 and the iteration value is 2, so the average phase is Pave=3/2=1.5.

For the next pulse of the periodically emitted light signal, the position of the return pulse 25 within the SPAD signal 106 has not substantively changed from the prior iteration. With the phase measurement value at P=2, the first and second window signals 110 and 112 are generated and selected by the signal generator circuit 160 such that the transition between the first and second temporal windows occurs at a time associated with the second phase measurement value. This window transition is designated at reference 322. Prior to the transition 322, the first window signal 110 is asserted to open the first temporal window 110a and the first counter circuit 102 is enabled to count pulses 22 within the return pulse 25 of the SPAD signal 106. After the transition 322, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=2, it would be expected that the UP count value exceeds the DN count value. Indeed, that is the case in this example. However, the difference value UP-DN in this example does not exceed Diff Limit. The process of FIG. 4 accordingly moves to step 214. Ambient detection processing is performed and it is determined that at least one of the UP count value and/or the DN count value exceeds the ambient threshold AmbTh. The process of FIG. 4 accordingly moves to step 216 and the value of the phase measurement is maintained at a value of P=2. In addition, the magnitude of the difference value UP-DN is loaded into one of the counter circuits. In particular, because the UP count value in the second counter circuit 104 is greater than the DN count value in the first counter circuit 102, step 218 requires that the second counter 104 be loaded with the difference value UP-DN and further that the first counter 102 be reset. The iteration value is further incremented to three, and the process returns to step 200.

With the phase measurement value at P=2, the digital signal processing circuit 150 sums the accumulated phase measurement values and calculates an average phase equal to the accumulated phase divided by the iteration value. At this point, accumulated phase is 1+2+2=5 and the iteration value is 3, so the average phase is Pave=5/3=1.67.

For the next pulse of the periodically emitted light signal, the position of the return pulse 25 within the SPAD signal 106 has not substantively changed from the prior iteration. With the phase measurement value at P=2, the first and second window signals 110 and 112 are generated and selected by the signal generator circuit 160 such that the transition between the first and second temporal windows occurs at a time associated with the second phase measurement value. This window transition is designated at reference 324. Prior to the transition 324, the first window signal 110 is asserted to open the first temporal window and the first counter circuit 102 is enabled to count pulses 22 within the return pulse 25 of the SPAD signal 106. After the transition 324, the second window signal 112 is asserted to open the second temporal window 112a and the second counter circuit 104 is enabled to count pulses 22 within the return pulse 25 of the SPAD signal 106 (that number of pulses being equal to the number of pulses 22 that occurred plus the difference value UP-DN previously loaded into the second counter 104). The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=2, as well as the influence of the difference value UP-DN previously loaded into the second counter 104, it would be expected that the UP count value exceeds the DN count value. Indeed, that is the case in this example. Furthermore, the difference value UP-DN exceeds Diff Limit. The process of FIG. 4 accordingly moves to step 206 and the value of the phase measurement is incremented by one to a value of P=3. The iteration value is further incremented to four, and the process returns to step 200.

With the phase measurement value at P=3, the digital signal processing circuit 150 sums the accumulated phase measurement values and calculates an average phase equal to the accumulated phase divided by the iteration value. At this point, accumulated phase is 1+2+2+3=8 and the iteration value is 4, so the average phase is Pave=8/4=2.

For the next pulse of the periodically emitted light signal, the position of the return pulse 25 within the SPAD signal 106 has not substantively changed from the prior iteration. With the phase measurement value at P=3, the first and second window signals 110 and 112 are generated and selected by the signal generator circuit 160 such that the transition between the first and second temporal windows occurs at a time associated with the third phase measurement value. This window transition is designated at reference 326. Prior to the transition 326, the first window signal 110 is asserted to open the first temporal window 110a and the first counter circuit 102 is enabled to count pulses 22 within the return pulse 25 of the SPAD signal 106. After the transition 326, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=3, it would be expected that the DN count value exceeds the UP count value. Indeed, that is the case in this example. Furthermore, the difference value UP-DN exceeds Diff Limit. The process of FIG. 4 accordingly moves to step 204 and the value of the phase measurement is decremented by one to a value of P=2. The iteration value is further incremented to five, and the process returns to step 200.

With the phase measurement value now P=2, the digital signal processing circuit 150 sums the accumulated phase measurement values and calculates an average phase equal to the accumulated phase divided by the iteration value. At this point, accumulated phase is 1+2+2+3+2=10 and the iteration value is 5, so the average phase is Pave=10/5=2.

For the next pulse of the periodically emitted light signal, the position of the return pulse 25 within the SPAD signal 106 has not substantively changed from the prior iteration. With the phase measurement value at P=2, the first and second window signals 110 and 112 are generated and selected by the signal generator circuit 160 such that the transition between the first and second temporal windows occurs at a time associated with the second phase measurement value. This window transition is designated at reference 328. Prior to the transition 328, the first window signal 110 is asserted top open the first temporal window and the first counter circuit 102 is enabled to count pulses 22 within the return pulse 25 of the SPAD signal 106. After the transition 328, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=2, it would be expected that the UP count value exceeds the DN count value. Indeed, that is the case in this example. However, the difference value UP-DN in this example does not exceed Diff Limit. The process of FIG. 4 accordingly moves to step 214. Ambient detection processing is performed and it is determined that at least one of the UP count value and/or the DN count value exceeds the ambient threshold AmbTh. The process of FIG. 4 accordingly moves to step 216 and the value of the phase measurement is maintained at a value of P=2. In addition, the difference value UP-DN is loaded into one of the counter circuits. In particular, because the UP count value in the second counter circuit 104 is greater than the DN count value in the first counter circuit 102, step 218 requires that the second counter 104 be loaded with the difference value UP-DN and further that the first counter 102 be reset. The iteration value is further incremented to six, and the process returns to step 200.

With the phase measurement value now P=2, the digital signal processing circuit 150 sums the accumulated phase measurement values and calculates an average phase equal to the accumulated phase divided by the iteration value. At this point, accumulated phase is 1+2+2+3+2+2=12 and the iteration value is 6, so the average phase is Pave=12/6=2.

The process as described above can be repeated relative to many pulses of the periodically emitted light signal and the value of Pave will eventually converge towards a value of 2.25 which corresponds to the location of the midpoint of the return pulse 25. From this Pave value, the TOF may be easily calculated since the time delay between the pulse of light and a phase measurement value of 2.25 is a known quantity.

Reference is now made to the example processing operation of FIG. 5C. Assume here that the return pulse 25 within the SPAD signal 106 is centered at a time located between the third and fourth phase measurement values, and in particular at a time about halfway between the third and fourth phase measurement values. This would be represented by a phase measurement value of 3.5 and it is this value that the TOF measurement circuit 100 is trying to detect. In a first iteration of the FIG. 4 process, the phase measurement value P is initialized to a designated initial value. In this example, the initial phase measurement value is P=1. The digital signal processing circuit 150 sums the accumulated phase measurement values and calculates an average phase equal to the accumulated phase divided by the iteration value. At this point, accumulated phase is 1 and the iteration value is 1, so the average phase is Pave=1/1=1.

With the phase measurement value at P=1, the first and second window signals 110 and 112 are generated and selected by the signal generator circuit 160 such that the transition between the first and second temporal windows occurs at a time associated with the first phase measurement value. This window transition is designated at reference 340. Prior to the transition 340, the first window signal 110 is asserted to open the first temporal window 110a and the first counter circuit 102 is enabled to count pulses 22 within the return pulse 25 of the SPAD signal 106. After the transition 340, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=1, there may be few to none pulses 22 to count. Indeed, the magnitude of the difference value UP-DN does not exceed Diff Limit. The process of FIG. 4 accordingly moves to step 214. Ambient detection processing is performed and it is determined that the UP count value and DN count value both fall below the ambient threshold AmbTh. The process of FIG. 4 accordingly moves to step 222 and the current phase measurement value is compared to a threshold phase value PhTh. Although the threshold phase value PhTh can have any selected value, in an embodiment the threshold phase value PhTh is set halfway between the range 0-7 of phase measurement values (for example, at 3.5). Since the current phase measurement value P=1 is less than the threshold phase value PhTh=3.5, the process moves to step 224 and the value of the phase measurement is incremented by one to a value of P=2. The iteration value is further incremented to two, and the process returns to step 200.

With the phase measurement value now P=2, the digital signal processing circuit 150 sums the accumulated phase measurement values and calculates an average phase equal to the accumulated phase divided by the iteration value. At this point, accumulated phase is 1+2=3 and the iteration value is 2, so the average phase is Pave=3/2=1.5.

For the next pulse of the periodically emitted light signal, the position of the return pulse 25 within the SPAD signal 106 has not substantively changed from the prior iteration. With the phase measurement value at P=2, the first and second window signals 110 and 112 are generated and selected by the signal generator circuit 160 such that the transition between the first and second temporal windows occurs at a time associated with the second phase measurement value. This window transition is designated at reference 342. Prior to the transition 342, the first window signal 110 is asserted to open the first temporal window 110a and the first counter circuit 102 is enabled to count pulses 22 within the return pulse 25 of the SPAD signal 106. After the transition 342, the second window signal 112 is asserted to open the second temporal window 112a and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=2, it would be expected that the UP count value exceeds the DN count value. Indeed, that is the case in this example. Furthermore, the difference value UP-DN exceeds Diff Limit. The process of FIG. 4 accordingly moves to step 206 and the value of the phase measurement is incremented by one to a value of P=3. The iteration value is further incremented to three, and the process returns to step 200.

With the phase measurement value now P=3, the digital signal processing circuit 150 sums the accumulated phase measurement values and calculates an average phase equal to the accumulated phase divided by the iteration value. At this point, accumulated phase is 1+2+3=6 and the iteration value is 3, so the average phase is Pave=6/3=2.

For the next pulse emission of the periodically emitted light signal, the position of the return pulse 25 within the SPAD signal 106 has not substantively changed from the prior iteration. With the phase measurement value at P=3, the first and second window signals 110 and 112 are generated and selected by the signal generator circuit 160 such that the transition between the first and second temporal windows occurs at a time associated with the third phase measurement value. This window transition is designated at reference 344. Prior to the transition 344, the first window signal 110 is asserted to open the first temporal window 110*a* and the first counter circuit 102 is enabled to count pulses 22 within the return pulse 25 of the SPAD signal 106. After the transition 344, the second window signal 112 is asserted to open the second temporal window 112*a* and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=3, it would be expected that the UP count value exceeds the DN count value. Indeed, that is the case in this example. Furthermore, the difference value UP-DN exceeds Diff Limit. The process of FIG. 4 accordingly moves to step 206 and the value of the phase measurement is incremented by one to a value of P=4. The iteration value is further incremented to four, and the process returns to step 200.

With the phase measurement value now P=4, the digital signal processing circuit 150 sums the accumulated phase measurement values and calculates an average phase equal to the accumulated phase divided by the iteration value. At this point, accumulated phase is 1+2+3+4=10 and the iteration value is 4, so the average phase is Pave=10/4=2.5.

For the next pulse of the periodically emitted light signal, the position of the return pulse 25 within the SPAD signal 106 has not substantively changed from the prior iteration. With the phase measurement value at P=4, the first and second window signals 110 and 112 are generated and selected by the signal generator circuit 160 such that the transition between the first and second temporal windows occurs at a time associated with the fourth phase measurement value. This window transition is designated at reference 346. Prior to the transition 346, the first window signal 110 is asserted to open the first temporal window 110*a* and the first counter circuit 102 is enabled to count pulses 22 within the return pulse 25 of the SPAD signal 106. After the transition 346, the second window signal 112 is asserted to open the second temporal window 112*a* and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=4, it would be expected that the DN count value exceeds the UP count value. Indeed, that is the case in this example. Furthermore, the difference value UP-DN exceeds Diff Limit. The process of FIG. 4 accordingly moves to step 204 and the value of the phase measurement is decremented by one to a value of P=3. The iteration value is further incremented to five, and the process returns to step 200.

With the phase measurement value now P=3, the digital signal processing circuit 150 sums the accumulated phase measurement values and calculates an average phase equal to the accumulated phase divided by the iteration value. At this point, accumulated phase is 1+2+3+4+3=13 and the iteration value is 5, so the average phase is Pave=13/5=2.6.

For the next pulse of the periodically emitted light signal, the position of the return pulse 25 within the SPAD signal 106 has not substantively changed from the prior iteration. With the phase measurement value at P=3, the first and second window signals 110 and 112 are generated and selected by the signal generator circuit 160 such that the transition between the first and second temporal windows occurs at a time associated with third phase measurement value. This window transition is designated at reference 348. Prior to the transition 348, the first window signal 110 is asserted to open the first temporal window 110*a* and the first counter circuit 102 is enabled to count pulses 22 within the return pulse 25 of the SPAD signal 106. After the transition 348, the second window signal 112 is asserted to open the second temporal window 112*a* and the second counter circuit 104 is enabled to count pulses 22 within the return pulse 25 of the SPAD signal 106. The digital summation circuit 130 operates to calculate the difference value UP-DN, with the DN count value, the difference value UP-DN and the UP count value received (FIG. 4, step 200) for processing in accordance with the method of FIG. 4. Given the relative timing of the return pulse 25 of the SPAD signal 106 compared to the window timing for enabling the first and second counter circuits with P=3, it would be expected that the UP count value exceeds the DN count value. Indeed, that is the case in this example. Furthermore, the difference value UP-DN exceeds Diff Limit. The process of FIG. 4 accordingly moves to step 206 and the value of the phase measurement is incremented by one to a value of P=4. The iteration value is further incremented to six, and the process returns to step 200.

With the phase measurement value now P=4, the digital signal processing circuit 150 sums the accumulated phase measurement values and calculates an average phase equal to the accumulated phase divided by the iteration value. At this point, accumulated phase is 1+2+3+4+3+4=17 and the iteration value is 6, so the average phase is Pave=17/6=2.83.

The process as described above can be repeated relative to many pulses of the periodically emitted light signal and the value of Pave will eventually converge towards a value of 3.5 which corresponds to the location of the midpoint of the return pulse 25. From this Pave value, the TOF may be easily calculated since the time delay between the pulse of light and a phase measurement value of 3.5 is a known quantity.

The first and second window signals 110 and 112 are controlled so that there is an equal amount of time within each of the first and second temporal windows 110*a* and 112*a*, but that the sum of the lengths of the first and second temporal windows 110*a* and 112*a* is less than the period of the periodically repeating light signal. This is shown in FIGS. 5A-5C. As a result, there are dead zones 110*b* and 112*b* during which neither counter circuit is enabled to make a count. The effect of this is shown in FIG. 5C. For example, during the first iteration the first and second counters are enabled by the first and second window signals 110 and 112 to count over a time period during which no pulses 22 of the return signal 25 are present. The process step 214 is provided to detect this condition as the first and second counters will only make ambient light detections during the time period when they are enabled. This will be a small (or no) count value and the comparison of the count values to the ambient threshold AmbTh will detect or infer that the return signal is positioned in one of the dead zones 110b or 112b. The phase measurement value must be changed in response thereto in order to move the enabled times of the counter circuits towards the pulses 22 of the return signal 25. The process step 222 compares the current phase measurement value to the phase threshold PhTh with the result of that comparison dictating where to increment or decrement the phase measurement value. This process essentially detects presence of the return signal 25 in the dead zone and moves the phase measurement value towards the location of the return signal 25.

Figure 6:
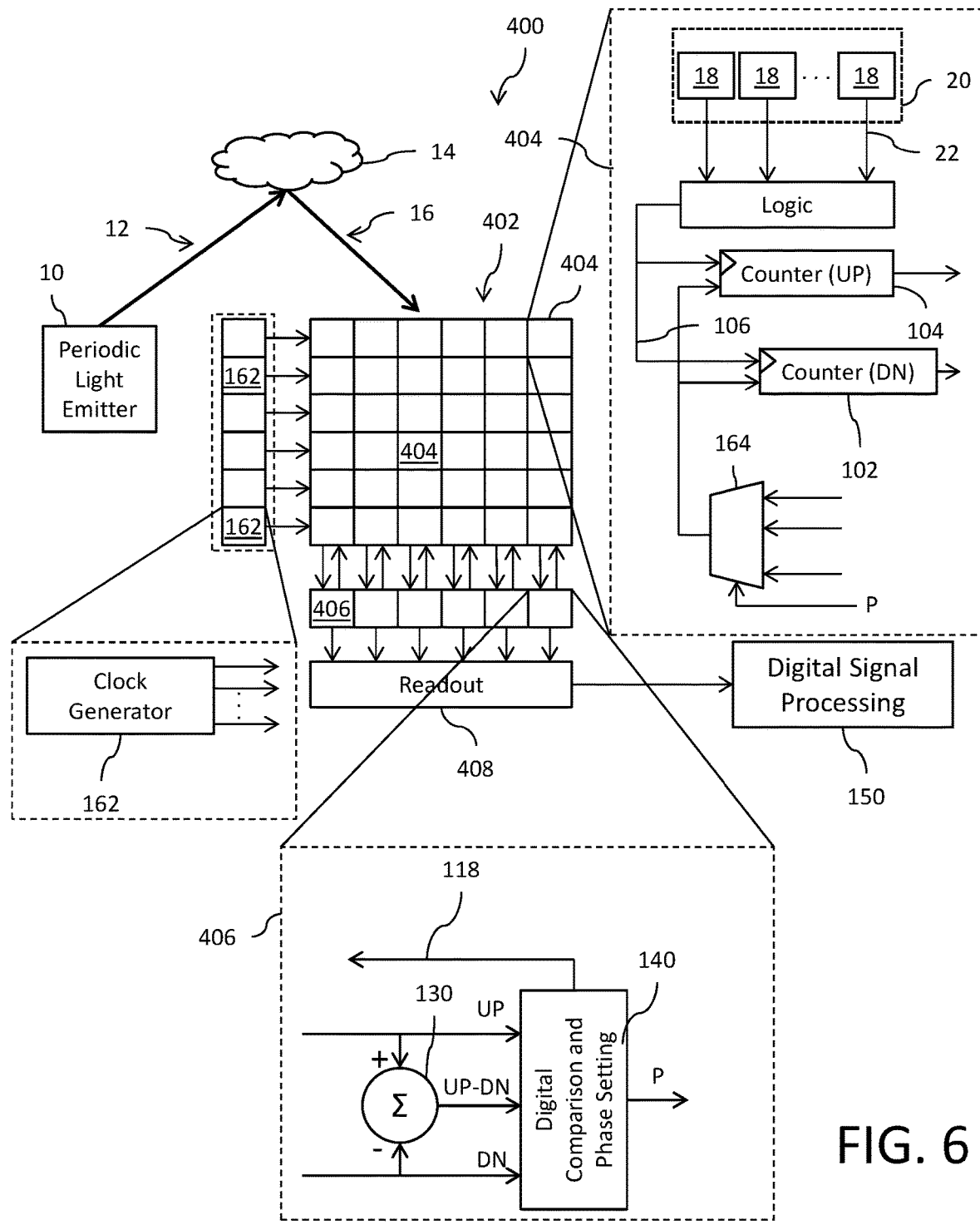
FIG. 6 is a block diagram of an imaging system.

Reference is now made to FIG. 6 showing a block diagram of an imaging system 400. The imaging system includes an array 402 of pixels 404 arranged in columns and rows. Each pixel 404 includes a SPAD array 20 including SPAR photosensors 18 as well as the logic combination circuit, first and second counters 102 and 104 and the selection circuit (such as a multiplexer with logic) 164. The imaging system further includes a phase processor circuit 406 for each column. Each phase processor circuit 406 includes the digital summation circuit 130 and the digital comparison and phase setting circuit 140. The imaging system further includes clock circuit 162 for each row. The imaging system also includes a readout circuit 408 that operates to readout the phase measurement values from the phase processor circuits 406 for the delivery to the digital signal processor 150.

The system architecture of FIG. 6 is advantageous because the phase processor circuit 406 is shared by all the pixels 404 of a given column and the clock circuit 162 is shared by all pixels 404 in a given row. This architectural configuration supports scalability of the system to accommodate a desired number of pixels 404 in an efficient and space saving manner. Additionally, by sharing the phase processor circuit 406 over the pixels 404 of a column and sharing the clock circuit 162 over the pixels 404 in a row, this circuitry is removed from each individual pixel so as to support a smaller area at the pixel and a decrease in pixel pitch.

It will be understood that the system architecture may support different row addressing and integration timing (shutter control) sequences. For example, support for a global shutter mode of operation or a rolling shutter mode of operation may be provided. It is also possible for other image sensor functions such as region of interest (cropping) to be supported. Thus, the architecture is not limited in any way to a specific timing sequence, pixel addressing method or other method of control.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. An imaging system, comprising:
an array of pixels arranged in rows and columns, wherein each pixel comprises:
a plurality of single photon avalanche diodes (SPADs);
a first counter having a clock input coupled to outputs of the plurality of SPADs in said pixel and configured to count during a first temporal window;
a second counter having a clock input coupled to outputs of the plurality of SPADs in said pixel and configured to count during a second temporal window; and
a phase selector circuit configured to select a transition time between the first and second temporal windows in response to a phase measurement value; and
a phase processor circuit for each column of said array, wherein the phase processor circuit is configured to process a first count value from the first counter and a second count value from the second counter to determine said phase measurement value.

2. The imaging system of claim 1, further comprising a clock generator circuit for each row of said array, wherein each clock generator circuit outputs a plurality of clock signals applied to the pixels of the corresponding row, said phase selector circuit receiving said plurality of clock signals as inputs, processing the plurality of clock signals and selecting certain clock signals in response to the phase measurement value to control opening of said first and second temporal windows.

3. The imaging system of claim 1, further comprising:
a readout circuit configured to readout the phase measurement values from the phase processor circuits; and
a processing circuit configured to process said phase measurement values from the readout circuit and determine an average phase measurement value over time.

4. The imaging system of claim 3, wherein said average phase measurement value over time is indicative of a time of flight measurement.

5. The imaging system of claim 1, wherein the phase processor circuit processes the first count value and the second count value to:
determine whether either of the first count value or second count value in a current iteration exceeds an ambient threshold value; and
if so, maintain the phase measurement value for a subsequent iteration and load one of the first and second counters with a value equal to a magnitude of a difference between the first and second count values.

6. The imaging system of claim 5, wherein said one the first and second counters loaded with the magnitude of the difference for the subsequent iteration is the counter whose count value is higher for the previous iteration.

7. The imaging system of claim 6, wherein the other of the first and second counters is reset for subsequent iteration.

8. The imaging system of the claim 6, wherein each of the first and second counters includes a load input configured to support loading of the counter with the magnitude of the difference.

9. The imaging system of claim 1, wherein the phase processor circuit processes the first count value and the second count value to:
determine whether both the first count value and second count value in a current iteration are less than an ambient threshold value; and
if so, then either:
increment the phase measurement value for a subsequent iteration if the phase measurement value in a current iteration is less than a phase threshold; or
decrement the phase measurement value for the subsequent iteration if the phase measurement value in the current iteration is greater than the phase threshold.

10. The imaging system of claim 1, wherein the phase processor circuit processes the first count value and the second count value to:
   determine whether the first count value is less than the second count value in a current iteration, and if so then increment the phase measurement value for a subsequent iteration; and
   determine whether the second count value is less than the first count value in the current iteration, and if so then decrement the phase measurement value for the subsequent iteration.

11. An imaging system, comprising:
   a plurality of single photon avalanche diodes (SPADs);
   a first counter having a clock input coupled to outputs of the plurality of SPADs and configured to count in response to assertion of a first enable signal;
   a second counter having a clock input coupled to outputs of the plurality of SPADs and configured to count in response to assertion of a second enable signal;
   a phase selector circuit configured to select a phase of the first and second enable signals in response to a phase measurement value; and
   a phase processor circuit configured to process a first count value from the first counter and a second count value from the second counter to determine said phase measurement value.

12. The imaging system of claim 11, further comprising a clock generator circuit configured to output a plurality of clock signals, said phase selector circuit receiving said plurality of clock signals as inputs, processing the plurality of clock signals and generating the first and second enable signals having phases selected by the phase measurement value.

13. The imaging system of claim 11, further comprising a processing circuit configured to process said phase measurement values and determine an average phase measurement value over time.

14. The imaging system of claim 13, wherein said average phase measurement value over time is indicative of a time of flight measurement.

15. The imaging system of claim 11, wherein the phase processor circuit processes the first count value and the second count value to:
   determine whether either of the first count value or second count value in a current iteration exceeds an ambient threshold value; and
   if so, maintain the phase measurement value for a subsequent iteration and load one of the first and second counters with a value dependent on a magnitude of a difference between the first and second count values.

16. The imaging system of claim 15, wherein said one the first and second counters loaded with the magnitude of the difference for the subsequent iteration is the counter whose count value is higher for the previous iteration.

17. The imaging system of claim 16, wherein the other of the first and second counters is reset for subsequent iteration.

18. The imaging system of the claim 16, wherein each of the first and second counters includes a load input configured to support loading of the counter with the magnitude of the difference.

19. The imaging system of claim 11, wherein the phase processor circuit processes the first count value and the second count value to:
   determine whether both the first count value and second count value in a current iteration are less than an ambient threshold value; and
   if so, then either:
      increment the phase measurement value for a subsequent iteration if the phase measurement value in a current iteration is less than a phase threshold; or
      decrement the phase measurement value for the subsequent iteration if the phase measurement value in the current iteration is greater than the phase threshold.

20. The imaging system of claim 11, wherein the phase processor circuit processes the first count value and the second count value to:
   determine whether the first count value is less than the second count value in a current iteration, and if so then increment the phase measurement value for a subsequent iteration; and
   determine whether the second count value is less than the first count value in the current iteration, and if so then decrement the phase measurement value for the subsequent iteration.

* * * * *

UNITED STATES PATENT AND TRADEMARK OFFICE
CERTIFICATE OF CORRECTION

PATENT NO. : 10,598,787 B2
APPLICATION NO. : 15/343427
DATED : March 24, 2020
INVENTOR(S) : Francescopaolo Mattioli Della Rocca et al.

Page 1 of 1

It is certified that error appears in the above-identified patent and that said Letters Patent is hereby corrected as shown below:

In the Specification

At Column 17, Line 21, please replace the term [[ SPAR ]] with -- SPAD --.

Signed and Sealed this
Seventeenth Day of November, 2020

Andrei Iancu
*Director of the United States Patent and Trademark Office*